(12) United States Patent
Arimori

(10) Patent No.: US 9,227,810 B2
(45) Date of Patent: Jan. 5, 2016

(54) MEDIUM TRANSPORT DEVICE AND RECORDING APPARATUS

(71) Applicant: SEIKO EPSON CORPORATION, Tokyo (JP)

(72) Inventor: Kazuhiko Arimori, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 3 days.

(21) Appl. No.: 14/082,526

(22) Filed: Nov. 18, 2013

(65) Prior Publication Data

US 2014/0138906 A1 May 22, 2014

(30) Foreign Application Priority Data

Nov. 21, 2012 (JP) ................. 2012-255009

(51) Int. Cl.
*B65H 27/00* (2006.01)
*F16C 33/10* (2006.01)

(52) U.S. Cl.
CPC ............ *B65H 27/00* (2013.01); *F16C 33/1055* (2013.01); *B65H 2401/241* (2013.01); *B65H 2404/17* (2013.01); *B65H 2801/12* (2013.01); *F16C 33/102* (2013.01)

(58) Field of Classification Search
CPC ..................... B65H 2402/52; B65H 2402/524; B65H 2402/525; B65H 2404/174; B65H 27/00; B65H 2401/241; F16C 33/102; F16C 33/1055
USPC ........................................................ 271/264
See application file for complete search history.

(56) References Cited

U.S. PATENT DOCUMENTS

| 6,308,621 | B1 * | 10/2001 | Douillard et al. ............. 101/216 |
| 6,599,066 | B1 * | 7/2003 | Koike et al. ................... 409/135 |
| 6,902,452 | B1 * | 6/2005 | Knight ................ B63H 23/326 384/428 |
| 8,498,559 | B2 * | 7/2013 | Zess et al. ...................... 399/325 |
| 2009/0317026 | A1 * | 12/2009 | Hanano ......................... 384/372 |
| 2011/0123140 | A1 * | 5/2011 | Liu ........................ F16C 33/104 384/293 |
| 2011/0206438 | A1 * | 8/2011 | Igarashi et al. ............... 400/578 |
| 2012/0020708 | A1 * | 1/2012 | Zess et al. ...................... 399/325 |
| 2014/0314353 | A1 * | 10/2014 | Blechschmidt ..... F16C 33/1075 384/123 |

FOREIGN PATENT DOCUMENTS

| JP | 05-092538 | 12/1993 |
| JP | 10-058278 | 3/1998 |
| JP | 10-184705 | 7/1998 |
| JP | 2008-291970 | 12/2008 |
| JP | 2011-241953 | 12/2011 |
| WO | WO/01/31215 | 5/2001 |

* cited by examiner

*Primary Examiner* — Jeremy R Severson
(74) *Attorney, Agent, or Firm* — Workman Nydegger

(57) ABSTRACT

A medium transport device includes a rotation shaft that enables transport of a medium as it rotates, and a bearing of the rotation shaft, in which the rotation shaft is provided with a hollow portion, a lubricating material containing unit that contains a lubricating material inside an end portion of the hollow portion, and holes that are open to a contact portion with the bearing from the lubricating material containing unit, and the lubricating material can be drawn to the contact portion from the lubricating material containing unit via the holes.

2 Claims, 9 Drawing Sheets

MEDIUM TRANSPORT DEVICE AND RECORDING APPARATUS

BACKGROUND

1. Technical Field

The present invention relates to a medium transport device, a recording apparatus, and a lubricity maintaining method to be used for a rotation shaft and a bearing of the rotation shaft of the medium transport device.

2. Related Art

In the related art, medium transport devices each of which includes a rotation shaft and a bearing of the rotation shaft which enable transport of media using rotation have been used. In such medium transport devices, a lubricant such as grease is applied to a contact portion of a rotation shaft with a bearing of the rotation shaft in order to maintain lubricity between the rotation shaft and the bearing of the rotation shaft.

In contrast, in many machine tools, each of which includes a rotation shaft and a bearing of the rotation shaft, have been used, and a lubricant is applied to a contact portion of the rotation shaft with the bearing of the rotation shaft. Since such a lubricant applied to a contact portion of a rotation shaft with a bearing of the rotation shaft is subjected to time degradation due to incorporation of impurities, oxidation, or the like, a supply mechanism that supplies a fresh lubricant to the contact portion is used as disclosed in, for example, JP-A-10-58278, JP-A-10-184705, International Publication No. WO01/31215, JP-A-2011-241953, JP-UM-A5-92538, and JP-A-2008-291970.

However, it is difficult to combine a small and complicated lubricant supply mechanism with a rotation shaft and a bearing of the rotation shaft in a medium transport device. For this reason, it is difficult to combine a complicated supply mechanism that supplies a lubricant to a contact portion of a rotation shaft with a bearing of the rotation shaft with such a medium transport device as disclosed in JP-A-10-58278, JP-A-10-184705, International Publication No. WO01/31215, JP-A-2011-241953, JP-UM-A-5-92538, and JP-A-2008-291970.

For this reason, it was difficult to maintain lubricity between a rotation shaft and a bearing of the rotation shaft in a medium transport device of the related art.

SUMMARY

Thus, an advantage of some aspects of the invention is to maintain lubricity between a rotation shaft and a bearing of the rotation shaft in a medium transport device.

According to an aspect of the invention, there is provided a medium transport device that includes a rotation shaft that enables transport of a medium as it rotates, and a bearing of the rotation shaft, in which the rotation shaft is provided with a hollow portion, a lubricating material containing unit that contains a lubricating material inside an end portion of the hollow portion, and holes that are open to a contact portion with the bearing from the lubricating material containing unit, and the lubricating material can be drawn to the contact portion from the lubricating material containing unit via the holes according to control of rotation of the rotation shaft by a control unit.

In this case, the lubricating material can be drawn to the contact portion as a lubricating agent according to the rotation of the rotation shaft without incorporation of a complicated lubricating agent supply mechanism. For this reason, lubricity between the rotation shaft and the bearing of the rotation shaft can be maintained in the medium transport device.

For example, drawing of the lubricating material to the contact portion is possible when the rotation shaft rotates faster when the lubricating material is to be drawn than when the medium is transported. In addition, it is possible by configuring the holes to have a shape that further facilitates drawing of the lubricating material when the rotation shaft rotates in the direction opposite to a rotation direction when the medium is transported, and by rotating the rotation shaft when the lubricating material is drawn in the direction opposite to the rotation direction when the medium is transported.

In the medium transport device, the holes may be provided in the rotation shaft with inclination toward an outer side of the rotation shaft from an inner side thereof on a rear side of the rotation shaft in a rotation direction when the lubricating material is drawn to the contact portion.

In this case, the holes are provided in the rotation shaft with inclination toward the outer side of the rotation shaft from the inner side thereof on the rear side of the rotation shaft in the rotation direction when the lubricating material is drawn to the contact portion. For this reason, when the lubricating material is to be drawn to the contact portion, the lubricating material can be drawn to the contact portion in acceleration when the rotation of the rotation shaft is started. In addition, the lubricating material can be applied to the entire contact portion according to the rotation of the rotation shaft thereafter.

In addition, in that case, the rotation direction of the rotation shaft when the medium is transported is opposite to the rotation direction of the rotation shaft when the lubricating material is drawn to the contact portion from the lubricating material containing unit via the holes. For this reason, by changing the rotation direction of the rotation shaft, a user can reliably and easily cause the lubricating material not to be drawn during normal medium transport when the lubricating material needs not to be drawn, and cause the lubricating material to be drawn when the lubricating material needs to be drawn to the contact portion.

In the medium transport device, the holes may be configured such that a contact with the bearing which is on an extension line that connects a rear end on the inner side of the rotation shaft in the rotation direction of the rotation shaft when the lubricating material is drawn to the contact portion to the rotation center of the rotation shaft is positioned on a front side further in the rotation direction of the rotation shaft when the lubricating material is drawn to the contact portion than a front end on the outer side of the rotation shaft in the rotation direction of the rotation shaft when the lubricating material is drawn to the contact portion.

In this case, only when the rotation shaft rotates in the rotation direction of the rotation shaft when the medium is transported, it is difficult to cause the lubricating material to be drawn to the contact portion. For this reason, it is possible to suppress the lubricating material from being drawn to the contact portion during the normal medium transport without an intention of a user.

In the medium transport device, the holes may be provided with ribs on rear ends of inner sides of the rotation shaft in the rotation direction of the rotation shaft when the lubricating material is drawn to the contact portion.

Here, a "rib" means a protrusion that extends in a longitudinal direction of the rotation shaft.

In this case, when the lubricating material is drawn to the contact portion, the ribs serve as guides when the lubricating material is drawn, and thus, the lubricating material can be reliably drawn to the contact portion.

The medium transport device may further include a control unit that controls the rotation of the rotation shaft, in which the control unit controls the rotation of the rotation shaft such that a rotation speed of the rotation shaft when the lubricating material is drawn to the contact portion from the lubricating material containing unit via the holes is higher than the rotation speed of the rotation shaft when the medium is transported.

In this case, the control unit controls the rotation of the rotation shaft such that the rotation speed of the rotation shaft when the lubricating material is drawn via the holes to a contact portion from a lubricating material containing unit is higher than the rotation speed of the rotation shaft when the medium is transported. For this reason, without drawing the lubricating material to the contact portion during the normal medium transport in which the lubricating material needs not to be drawn to the contact portion, the rotation speed of the rotation shaft is raised and thereby the lubricating material can be drawn to the contact portion when the lubricating material needs to be drawn to the contact portion.

The medium transport device may further include a counting unit that counts the number of rotation times of the rotation shaft. The control unit may control the rotation of the rotation shaft such that the lubricating material is drawn to the contact portion from the lubricating material containing unit via the holes every time the number of rotation times of the rotation shaft counted by the counting unit reaches a pre-set number.

In this case, the lubricating material is drawn to the contact portion from the lubricating material containing unit via the holes every time the number of rotation times of the rotation shaft reaches the pre-set number. For this reason, with a number of usages of the medium transport device, a fresh lubricating material can be drawn to the contact portion in response to time degradation of the lubricating material of the contact portion caused by incorporation of impurities, oxidation, or the like.

Note that, as "the number of rotation times of the rotation shaft", the number obtained by performing computation according to a rotation speed or the like and then correction, the number of transport times of a medium, or the number obtained by performing computation and correction of the number of transport times according to a size of the medium, or the like may be used, rather than using the accurate number of actual rotation times of the rotation shaft. In addition, the medium transport device that uses such a number is also included in the aspect.

The medium transport device may further include a measurement unit that measures a rotation load of the rotation shaft on the bearing, and the control unit may control the rotation of the rotation shaft such that the lubricating material is drawn to the contact portion from the lubricating material containing unit via the holes when the rotation load measured by the measurement unit is equal to or higher than a pre-set rotation load.

In this case, the lubricating material is drawn to the contact portion from the lubricating material containing unit via the holes when the rotation load is equal to or higher than the pre-set rotation load. For this reason, the fresh lubricating material can be drawn to the contact portion in response to the time degradation of the lubricating material of the contact portion and the rotation load being equal to or higher than the pre-set rotation load.

In the medium transport device, the rotation shaft may be provided with air vents that are open to the contact portion with the bearing from the lubricating material containing unit.

In this case, the air vents that are open to the contact portion with the bearing from the lubricating material containing unit are provided in the rotation shaft. For this reason, when the lubricating material is drawn to the contact portion, it is possible to suppress a difficulty in drawing the lubricating material caused by negative pressure of the lubricating material containing unit.

Note that the "air vent" may be configured to be replaced by some of the holes by providing a plurality of holes, or to be provided in the rotation shaft separately from the holes.

The medium transport device may further include a timer that measures time, and the control unit may control the rotation of the rotation shaft such that the lubricating material is drawn to the contact portion from the lubricating material containing unit via the holes every time a time measured by the timer reaches a pre-set time.

In this case, the lubricating material is drawn to the contact portion from the lubricating material containing unit via the holes every time the time measured by the timer reaches the pre-set time. Thus, the fresh lubricating material can be drawn to the contact portion in response to the time degradation of the lubricating material of the contact portion caused by incorporation of impurities, oxidation, or the like as time elapses.

In the medium transport device, the control unit may control continuation of the rotation of the rotation shaft after the lubricating material is drawn to the contact portion from the lubricating material containing unit.

In this case, the rotation of the rotation shaft after the lubricating material is drawn to the contact portion from the lubricating material containing unit continues. For this reason, the lubricating material can be applied to the entire contact portion according to the rotation of the rotation shaft after the lubricating material is drawn to the contact portion.

Note that duration of rotation, the number of rotation times, or the like of the rotation shaft after the lubricating material is drawn can be set according to the type of a lubricating material to be used, the area of the contact portion, or the like as needed. For example, it is preferable that the duration of the rotation of the rotation shaft and an application state of the lubricating material to the contact portion after drawing of the lubricating material be checked in advance, and then the duration be set based on a checking result.

The medium transport device may further include a setting unit that can set a rotation speed of the rotation shaft, and the control unit may control the rotation of the rotation shaft at the rotation speed set by the setting unit when the lubricating material is drawn to the contact portion from the lubricating material containing unit.

In this case, the setting unit that can set the rotation speed of the rotation shaft is provided. Thus, when an amount of the lubricating material in the lubricating material containing unit changes, or the like, it is possible to respond to a case in which the rotation speed of the rotation shaft when the lubricating material is drawn to the contact portion from the lubricating material containing unit is desired to be changed from that of the original rotation speed. For example, an amount of the lubricating material in the lubricating material containing unit decreases as the lubricating material in the lubricating material containing unit is used, however, in such a case, changing the rotation speed to an optimum rotation speed of the rotation shaft when the lubricating material is drawn to the contact portion is considered. The aspect can respond to such a case.

In the medium transport device, the control unit may control acceleration and deceleration of rotation of the rotation shaft to be repeated when the lubricating material is drawn to the contact portion from the lubricating material containing unit.

In this case, acceleration and deceleration of rotation of the rotation shaft are repeated. In the configuration in which the holes are provided in the rotation shaft with inclination to the rear side of the rotation shaft in the rotation direction when the lubricating material is drawn to the contact portion, drawing of the lubrication material to the contact portion is conspicuous during acceleration of the rotation of the rotation shaft when the lubricating material is drawn to the contact portion. Thus, in this case, as the number of acceleration times of the rotation of the rotation shaft increases, the lubricating material can be surely drawn to the contact portion during acceleration of the rotation of the rotation shaft.

In the medium transport device, the lubricating material containing unit may taper toward an outer side of the rotation shaft from an inner side thereof.

In this case, the lubricating material containing unit tapers toward the outer side of the rotation shaft from the inner side thereof. For this reason, the lubricating material contained in the lubricating material containing unit can be drawn to the contact portion with efficiency.

In the medium transport device according, the holes may taper toward an outer side of the rotation shaft from an inner side thereof.

In this case, the holes taper toward the outer side of the rotation shaft from the inner side thereof. For this reason, a drawing destination of the lubricating material can be accurately set.

In the medium transport device, the holes may widen toward an outer side of the rotation shaft from an inner side thereof.

In this case, the holes widen toward the outer side of the rotation shaft from the inner side thereof. For this reason, the lubricating material can be drawn in a wide range.

According to another aspect of the invention, there is provided a recording apparatus including a medium transport device, and a recording unit that performs recording on a medium that is transported by the medium transport device.

In this case, lubricity between a rotation shaft and a bearing of the rotation shaft can be maintained in the medium transport device provided in the recording apparatus without incorporating a complicated lubricating material supply mechanism with the recording apparatus.

According to still another aspect of the invention, there is provided a lubricity maintaining method used for a rotation shaft and a bearing in a medium transport device that includes: the rotation shaft that enables transport of a medium as it rotates; the bearing of the rotation shaft; and a control unit that controls the rotation of the rotation shaft, in which the rotation shaft is provided with a lubricating material containing unit that contains a lubricating material therein and holes that are open to a contact portion with the bearing from the lubricating material containing unit, and in which the lubricating material can be drawn to the contact portion from the lubricating material containing unit via the holes according to control on rotation of the rotation shaft by the control unit, the method includes counting the number of rotation times of the rotation shaft, determining whether or not the number of rotation times of the rotation shaft counted in the counting of the number of rotation times reaches a pre-set number, and controlling rotation of the rotation shaft by the control unit such that the lubricating material is drawn to the contact portion from the lubricating material containing unit via the holes every time the number of rotation times of the rotation shaft is determined to reach the pre-set number in the determining of the number of rotation times.

In this case, the lubricating material is drawn to the contact portion from the lubricating material containing unit via the holes every time the number of rotation times of the rotation shaft reaches the pre-set number. For this reason, a fresh lubricating material can be drawn to the contact portion in response to cases in which the number of rotation times of the rotation shaft reaches the pre-set number and the lubricating material of the contact portion is subject to time degradation caused by incorporation of impurities, oxidation, or the like.

According to still another aspect of the invention, there is provided a lubricity maintaining method used for a rotation shaft and a bearing in a medium transport device that includes: the rotation shaft that enables transport of a medium as it rotates; the bearing of the rotation shaft; and a control unit that controls the rotation of the rotation shaft, in which the rotation shaft is provided with a lubricating material containing unit that contains a lubricating material therein and holes that are open to a contact portion with the bearing from the lubricating material containing unit, and in which the lubricating material can be drawn to the contact portion from the lubricating material containing unit via the holes according to control on rotation of the rotation shaft by the control unit, the method includes measuring a rotation load of the rotation shaft on the bearing, determining whether or not the rotation load of the rotation shaft measured in the measuring of the rotation load is equal to or higher than a pre-set rotation load, and controlling rotation of the rotation shaft by the control unit such that the lubricating material is drawn to the contact portion from the lubricating material containing unit via the holes when the rotation load of the rotation shaft is determined to be equal to or higher than the pre-set rotation load in the determining of the rotation load.

In this case, when the rotation load is equal to or higher than the pre-set rotation load, the lubricating material is drawn to the contact portion from the lubricating material containing unit via the holes. For this reason, a fresh lubricating material can be drawn to the contact portion in response to a case in which the lubricating material of the contact portion is subject to time degradation and the rotation load is equal to or higher than the pre-set rotation load.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment FIGS. 1 to 5

Hereinafter, a recording apparatus according to an embodiment of the invention will be described in detail with reference to the accompanying drawings.

Note that, in the embodiment provided below, a recording apparatus equipped with a medium transport device will be described. However, the medium transport device of the invention is not limited to a medium transport device included in a recording apparatus.

In addition, in the embodiment provided below, an ink jet recording apparatus that performs recording by discharging an ink from a recording head will be described as the recording apparatus. However, the recording apparatus of the invention is not limited to the ink jet recording apparatus.

First, an overview of a recording apparatus according to a first embodiment of the invention will be described.

Figure 1:
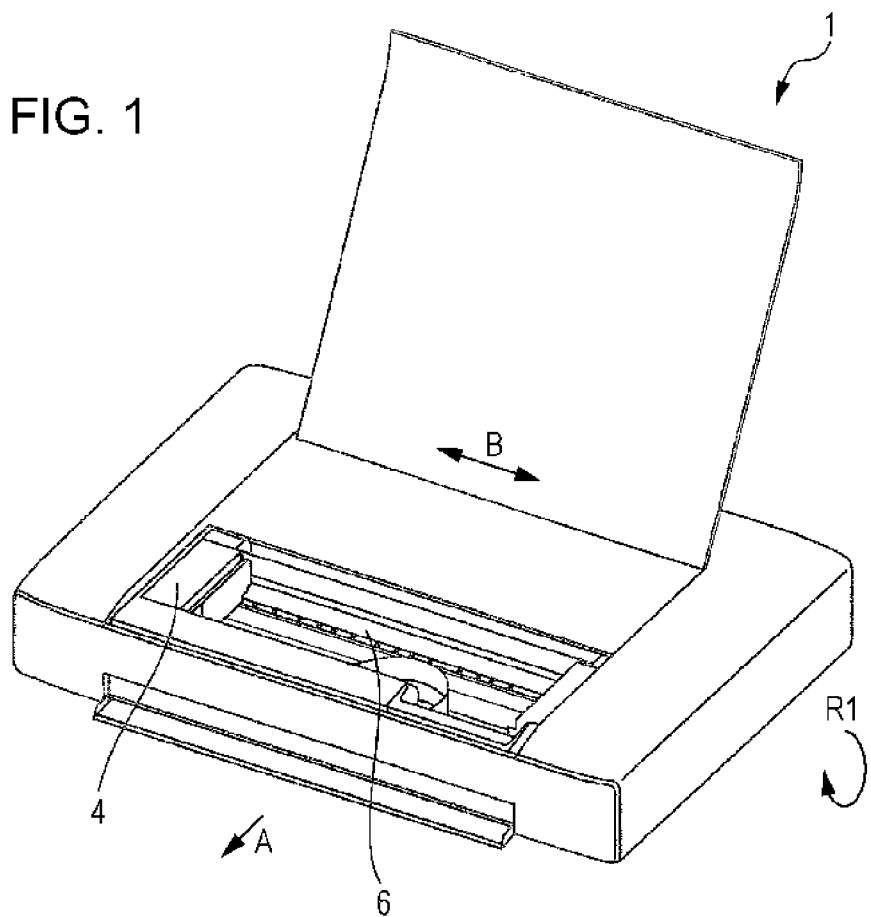
FIG. 1 is a schematic perspective view showing a recording apparatus according to a first embodiment of the invention.

FIG. 1 is a schematic perspective view showing a recording apparatus 1 according to the first embodiment of the invention.

The recording apparatus 1 of the present embodiment includes an ink cartridge 4 therein. The recording apparatus 1 of the present embodiment has a recording head (see FIG. 8) below the ink cartridge 4, and causes the recording head 14 to perform reciprocating scanning in a scanning direction B using a carriage that is not shown in the drawing to perform recording on a medium to be recorded which is transported in a transport direction A.

Inside the recording apparatus 1, a rotation shaft 6 that can transport a medium to be recorded is provided. As the rotation shaft 6 is rotated in a rotation direction R1, the medium to be recorded that is placed on an external cover 2 is transported in the transport direction A.

Next, the rotation shaft 6 and a bearing 7 which are the major portions of the recording apparatus 1 of the present embodiment for transporting media will be described.

Figure 2:
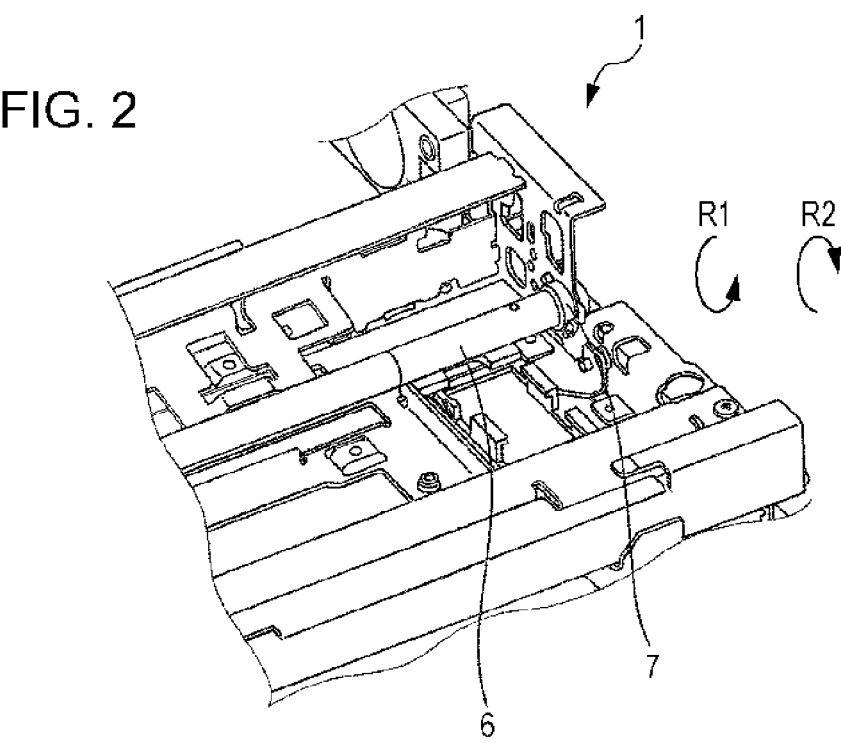
FIG. 2 is a schematic perspective view showing a rotation shaft for transporting a medium and a bearing in the recording apparatus according to the first embodiment of the invention.

FIG. 2 is a schematic perspective view showing the rotation shaft 6 for transporting a medium and the bearing 7 in the recording apparatus 1.

The bearing 7 of the rotation shaft 6 is configured to be fixed to a main body portion of the recording apparatus 1. In addition, the rotation shaft 6 is connected to a transport motor 15 (see FIG. 8) via a gear wheel, and is able to rotate with respect to the bearing 7 that is fixed to the recording apparatus 1 in the rotation direction R1 or a rotation direction R2.

Figure 3:
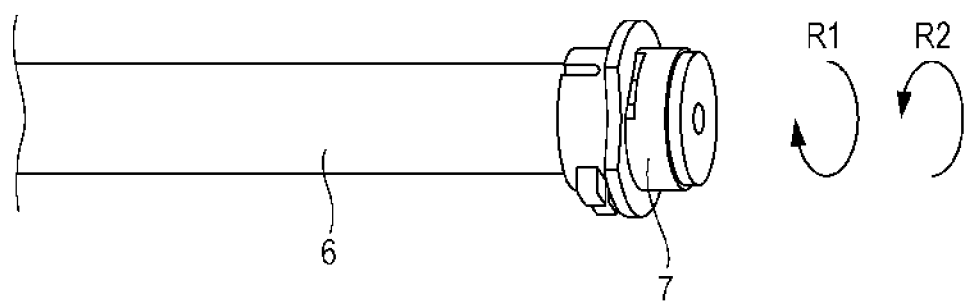
FIG. 3 is an enlarged view showing the rotation shaft for transporting a medium and the bearing in the recording apparatus according to the first embodiment of the invention.
Figure 4:
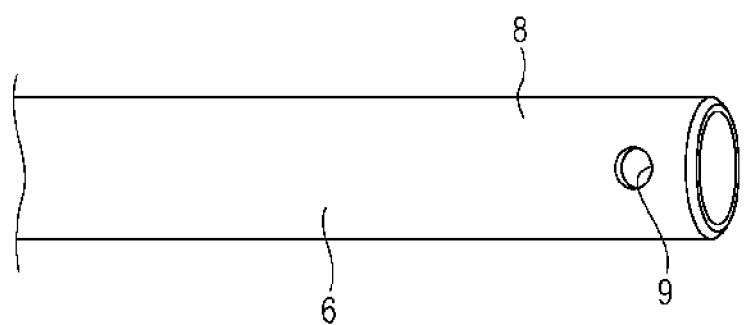
FIG. 4 is an enlarged view showing a state in which the bearing is removed from the rotation shaft for transporting a medium in the recording apparatus according to the first embodiment of the invention.

FIG. 3 is an enlarged view showing the rotation shaft 6 for transporting a medium and the bearing 7 in the recording apparatus 1, and FIG. 4 is an enlarged view showing a state in which the bearing 7 is removed from the rotation shaft 6 for transporting a medium in the recording apparatus 1.

The recording apparatus 1 of the present embodiment is configured to be provided with holes 9 in a contact portion 8 of the rotation shaft 6 with the bearing 7, and to be able to draw a lubricating material G (see FIG. 5) from a lubricating material containing unit 10 (see FIG. 5) to the contact portion 8 via the holes 9. With an effect of the lubricating material G giving lubricity, the rotation shaft 6 is configured to be able to smoothly rotate with respect to the bearing 7 that is fixed to the recording apparatus 1 in the rotation direction R1 and the rotation direction R2.

Next, a lubricating material containing unit that is a major part of the recording apparatus 1 of the present embodiment will be described.

Figure 5:
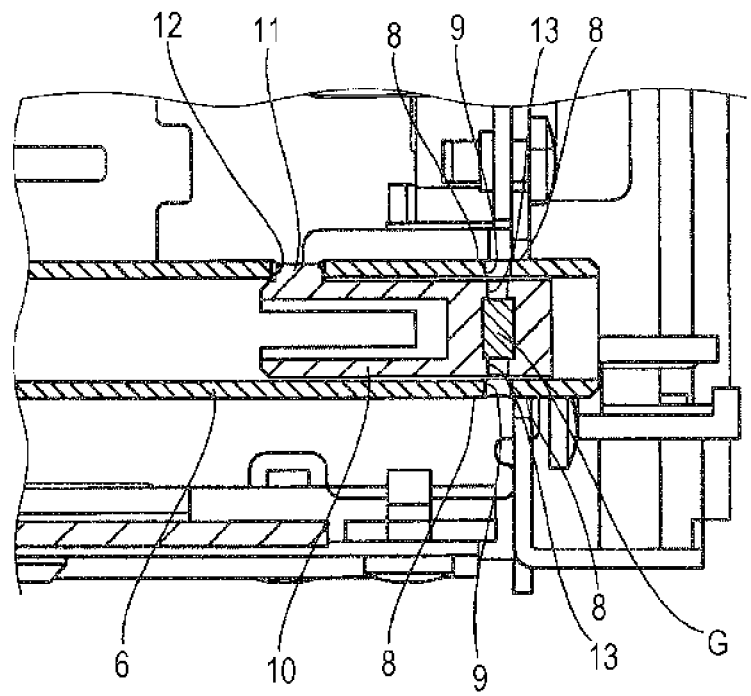
FIG. 5 is a front cross-sectional view showing the rotation shaft for transporting a medium in the recording apparatus according to the first embodiment of the invention.
Figure 6:
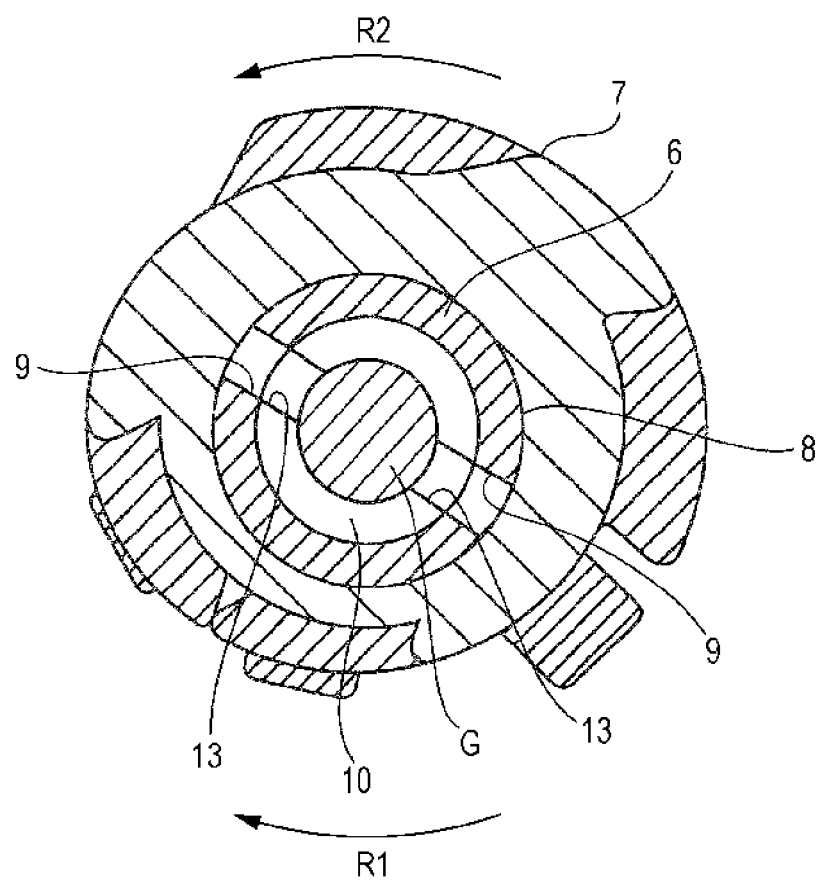
FIG. 6 is a side cross-sectional view showing the rotation shaft for transporting a medium in the recording apparatus according to the first embodiment of the invention.
Figure 7:
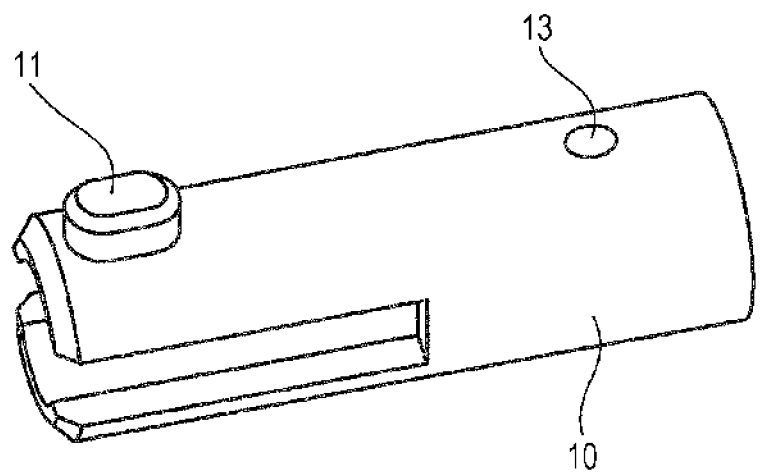
FIG. 7 is an enlarged view showing a lubricating material containing unit of the rotation shaft for transporting a medium in the recording apparatus according to the first embodiment of the invention.

FIG. 5 is a front cross-sectional view showing the rotation shaft 6 for transporting a medium in the recording apparatus 1. FIG. 6 is a side cross-sectional view showing the rotation shaft 6 for transporting a medium in the recording apparatus 1, and FIG. 7 is an enlarged view showing the lubricating material containing unit 10 of the rotation shaft 6.

Note that FIG. 5 illustrates a state in which the bearing 7 is removed from the rotation shaft 6.

The rotation shaft 6 is configured to be a hollow shaft, and is provided with the lubricating material containing unit 10 that contains the lubricating material G therein. A protrusion 11 is provided in the lubricating material containing unit 10 so as to be fitted into a fitting part 12 that is provided in the rotation shaft 6. Holes 13 are provided in the lubricating material containing unit 10, and when the lubricating material G is drawn to the contact portion 8, the lubricating material G is drawn to the contact portion 8 from the lubricating material containing unit 10 via the holes 13 and the holes 9. In other words, the holes 13 and 9 are open to the contact portion 8 with the bearing 7 from the lubricating material containing unit 10.

Note that, since the lubricating material G has high viscosity, the lubricant is not drawn to the contact portion 8 at a rotation speed of the rotation shaft 6 when a medium is transported. In the recording apparatus 1 of the present embodiment, when the lubricating material G is drawn to the contact portion 8, the rotation shaft 6 rotates at a rotation speed higher than the rotation speed at the time of transporting a medium. In other words, in the recording apparatus 1 of the present embodiment, drawing or non-drawing of the lubricating material G to the contact portion 8 is controlled according to the difference between the rotation speeds.

In addition, in the recording apparatus 1 of the present embodiment, although the lubricating material containing unit 10 is provided as a separate constituent member from the rotation shaft 6, the recording apparatus is not limited to the configuration. The rotation shaft 6 may be configured to contain a lubricant in its own hollow part.

In addition, a diameter and a shape of the holes 9 are preferably decided based on the type of a lubricating material to be used, a range in which the rotation speed of the rotation shaft 6 can be controlled, and the like.

Note that the rotation shaft 6 of the present embodiment is provided with two holes 9, and the holes 9 also serve as air vents. Thus, the holes suppress a difficulty of drawing the lubricating material G to the contact portion 8 when the lubricating material G is drawn to the contact portion 8, and accordingly, the inside of the lubricating material containing unit 10 has negative pressure. However, the embodiment is not limited to the above configuration, and an air vent may or may not be separately provided in the rotation shaft 6.

In addition, although components and physical properties of the lubricant are not particularly limited, they are preferably decided based on an applicable range of the diameter and the shape of the holes 9, a material of the rotation shaft 6, a range in which the rotation speed of the rotation shaft 6 can be controlled, and the like.

Next, an electrical configuration of the recording apparatus 1 of the present embodiment will be described.

Figure 8:
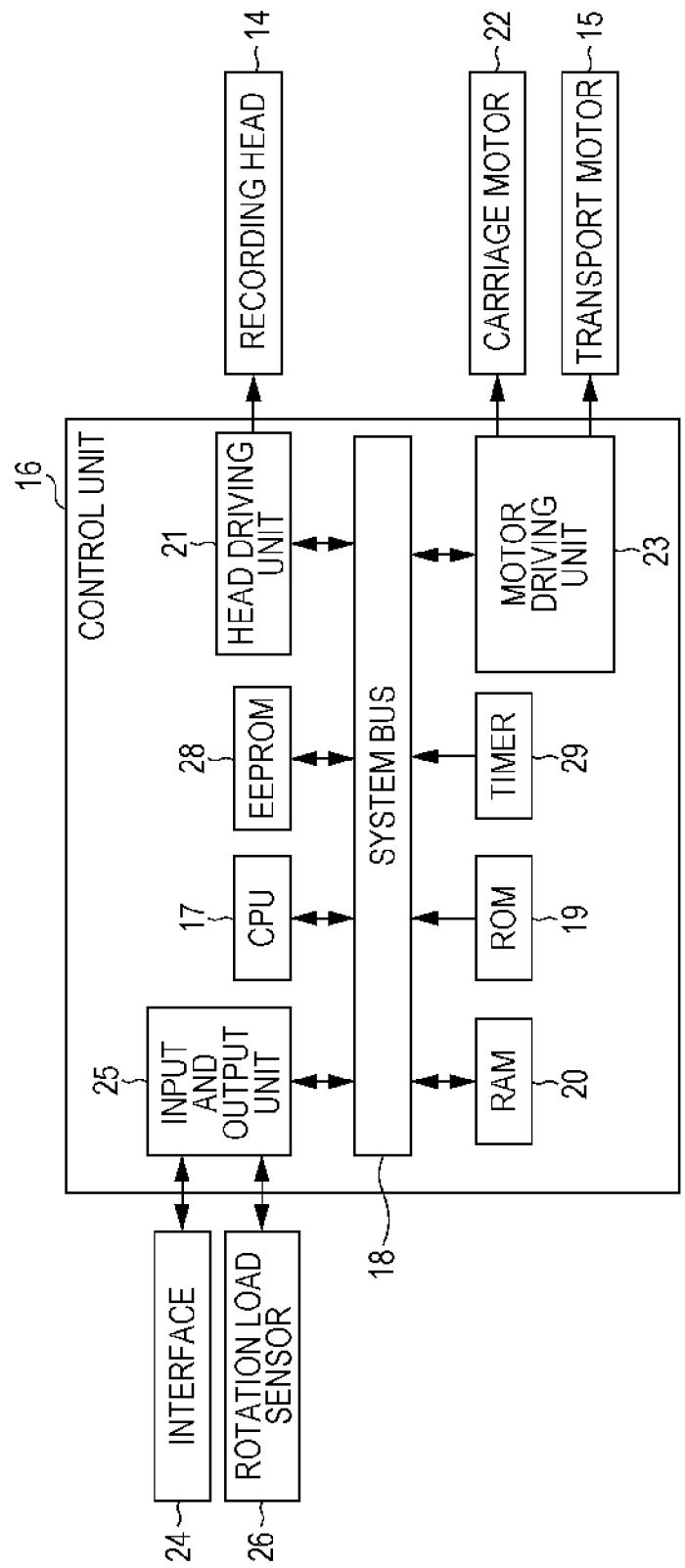
FIG. 8 is a block diagram of the recording apparatus according to the first embodiment of the invention.

FIG. 8 is a block diagram of the recording apparatus 1 of the present embodiment.

A control unit 16 is provided with a CPU 17 that takes charge of controlling the overall recording apparatus 1. The CPU 17 is connected to a ROM 19 that stores various kinds of control programs executed by the CPU 17, a RAM 20 that can temporarily store data, an EEPROM 28 as non-volatile memory, and a timer 29 via a system bus 18. In addition, the CPU 17 is connected to a head driving unit 21 for driving the recording head 14 via the system bus 18. Furthermore, the CPU is connected to a carriage motor 22 for moving the carriage and a motor driving unit 23 for driving the transport motor 15 that is used to transport the medium to be recorded. Moreover, the CPU is connected to an input and output unit 25 for transmitting and receiving data and signals with an interface 24 with which recording data and the like are input from an external device such as a PC or the like; a rotation load sensor 26 that measures a rotation load of the rotation shaft 6 on the bearing 7; and the like. Note that a sensor of the related art can be used as the rotation load sensor 26, or for example, a sensor that can sense the rotation speed at the time of a predetermined voltage, or the like can be used.

The control unit 16 can control rotation of the rotation shaft 6 via the motor driving unit 23 and the transport motor 15, and according to control of the rotation speed of the rotation shaft 6 by the control unit 16, the lubricating material G can be drawn to the contact portion 8 from the lubricating material containing unit 10 via the holes 13 and 9.

For this reason, the recording apparatus 1 of the present embodiment can cause the lubricating material G as a lubricant to be drawn to the contact portion 8 without being incorporated with a complicated lubricant supply mechanism, and can maintain lubricity between the rotation shaft 6 and the bearing 7.

In addition, the control unit 16 has a role of a counting unit that counts the number of rotation times of the rotation shaft 6. The control unit 16 can control the rotation of the rotation shaft 6 (increase the rotation speed of the rotation shaft 6) so that the lubricating material G is drawn from the lubricating material containing unit 10 to the contact portion 8 via the holes 13 and 9 every time the counted number of the rotation times of the rotation shaft 6 reaches a pre-set number.

Note that the recording apparatus 1 of the present embodiment accurately counts the number of actual rotation times of the rotation shaft 6. However, rather than the accurate number of actual rotation times of the rotation shaft 6, for example, the number obtained by performing computation according to the rotation speed or the like and then correction, the number of transport times of a medium, or the number obtained by performing computation and correction of the number of transport times according to a size of the medium, or the like may be used as the number of rotation times.

For this reason, it is possible to draw the fresh lubricating material G to the contact portion 8 in response to time degradation of the lubricating material G of the contact portion 8 caused by incorporation of impurities, oxidation, or the like due to many usages of the recording apparatus 1.

Furthermore, the control unit 16 has a role as a measurement unit that measures the rotation load of the rotation shaft 6 on the bearing 7, together with the rotation load sensor 26. The control unit 16 can control rotation of the rotation shaft 6 (increase the rotation speed of the rotation shaft 6) so that the lubricating material G is drawn to the contact portion 8 from the lubricating material containing unit 10 via the holes 13 and 9 when the rotation load is equal to or higher than a pre-set rotation load.

Thus, the fresh lubricating material G can be drawn to the contact portion 8 in response to a rotation load being equal to or higher than the pre-set rotation load due to the time degradation of the lubricating material G of the contact portion 8 caused by incorporation with impurities, oxidation, or the like.

Note that the control unit 16 can read a time measured by the timer 29, and can control rotation of the rotation shaft 6 so that the lubricating material G is drawn to the contact portion 8 from the lubricating material containing unit 10 via the holes 13 and 9 whenever the pre-set time comes.

Thus, as time elapses, the fresh lubricating material G can be drawn to the contact portion 8 in response to the time degradation of the lubricating material G of the contact portion 8 caused by incorporation with impurities, oxidation, or the like.

In addition, the control unit 16 controls rotation of the rotation shaft 6 so that the rotation speed of the rotation shaft 6 when the lubricating material G is drawn to the contact portion 8 from the lubricating material containing unit 10 via the holes 13 and 9 is higher than the rotation speed of the rotation shaft 6 when a medium is transported.

Thus, without drawing the lubricating material G to the contact portion 8 during the normal medium transport in which it is not necessary to draw the lubricating material G to the contact portion 8, the lubricating material G can be drawn to the contact portion 8 by increasing the rotation speed of the rotation shaft 6 when the lubricating material G needs to be drawn to the contact portion 8.

Note that, although the recording apparatus 1 of the present embodiment is configured to rotate the rotation shaft 6 in the rotation direction R1 when a medium is normally transported and when the lubricating material G is drawn to the contact portion 8, the recording apparatus is not limited to the configuration.

In addition, the control unit 16 continues causing the rotation shaft 6 to rotate after the lubricating material G is drawn from the lubricating material containing unit 10 to the contact portion 8.

For this reason, the lubricating material G can be applied to the entire contact portion 8 according to rotation of the rotation shaft 6 after the lubricating material G is drawn to the contact portion 8.

Note that, although duration of the rotation of the rotation shaft 6 after drawing of the lubricating material G is set based on a checking result by assigning the duration, and checking an application state of the lubricating material G to the contact portion 8, it is not particularly limited to the setting method.

In addition, a user can change a setting of the rotation speed of the rotation shaft 6 by inputting the rotation speed of the rotation shaft 6 to the control unit 16 from a PC or the like via the interface 24. In other words, the control unit 16 has a role as a setting unit of the rotation speed of the rotation shaft 6. For this reason, the control unit 16 can respond to a case in which the amount of the lubricating material G contained in the lubricating material containing unit 10 changes, or when the rotation speed of the rotation shaft 6 when the lubricating material G is drawn from the lubricating material containing unit 10 to the contact portion 8 is desired to be changed from the original rotation speed.

Figure 9:
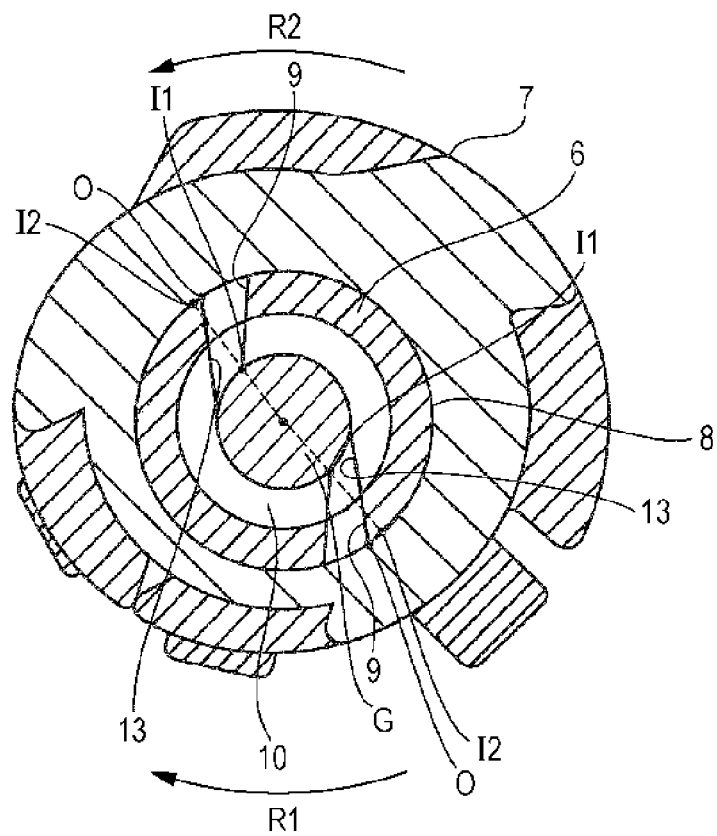
FIG. 9 is a side cross-sectional view showing a rotation shaft for transporting a medium in a recording apparatus according to a second embodiment of the invention.

Second Embodiment FIG. 9

Next, a recording apparatus according to a second embodiment of the present invention will be described. Note that constituent elements overlapping with those of the above embodiment are denoted by the same reference numerals, and thus detailed description thereof will be omitted.

FIG. 9 is a side cross-sectional view showing a rotation shaft for transporting a medium in the recording apparatus according to the second embodiment of the invention.

The holes 9 and 13 of the rotation shaft 6 of the present embodiment are inclined to a rear side of the rotation direction R2 toward the bearing 7 side (the outer side) from the lubricating material containing unit 10 (inner side).

With this configuration, when the lubricating material G is to be drawn to the contact portion 8, the recording apparatus 1 of the present embodiment can cause the lubricating material G to be drawn to the contact portion 8 in the stage of acceleration during a start of rotation of the rotation shaft 6. Then, the lubricating material G can be applied to the entire contact portion 8 according to rotation of the rotation shaft 6 thereafter.

Note that the diameter, the shape and inclination of the holes 9 and the holes 13 are preferably decided based on the type of a lubricating material to be used, the range in which the rotation speed of the rotation shaft 6 can be controlled, and the like.

In addition, the recording apparatus 1 of the present embodiment is configured to rotate the rotation shaft 6 in the rotation direction R1 during the normal medium transport, and to rotate the rotation shaft 6 in the rotation direction R2 when the lubricating material G is drawn to the contact portion 8.

For this reason, by changing the rotation direction of the rotation shaft 6, a user can reliably and easily cause the lubricating material G not to be drawn during the normal medium transport when the lubricating material G needs not be drawn, and cause the lubricating material G to be drawn when the lubricating material G needs to be drawn to the contact portion 8.

Note that the holes 9 and the holes 13 of the rotation shaft 6 of the present embodiment are configured such that a contact 12 with the bearing 7 which is on an extension line that connects a rear end 11 on the lubricating material containing unit 10 side in the rotation direction R2 and the rotation center C is positioned on a front side further in the rotation direction R2 than a front end O on the bearing 7 side in the rotation direction R2.

With this configuration, it is difficult to draw the lubricating material G to the contact portion 8 only when the rotation shaft 6 rotates in the rotation direction R1, and it is possible to suppress the lubricating material G from being drawn to the contact portion 8 during the normal medium transport, which is not intended by a user.

Note that the control unit 16 of the recording apparatus 1 of the present embodiment controls such that acceleration and deceleration of the rotation of the rotation shaft 6 are repeated when the lubricating material G is drawn from the lubricating material containing unit 10 to the contact portion 8. For this reason, as the number of acceleration times of the rotation of the rotation shaft 6 increases, the lubricating material G can be more reliably drawn to the contact portion 8 during the acceleration of the rotation of the rotation shaft 6.

Figure 10:
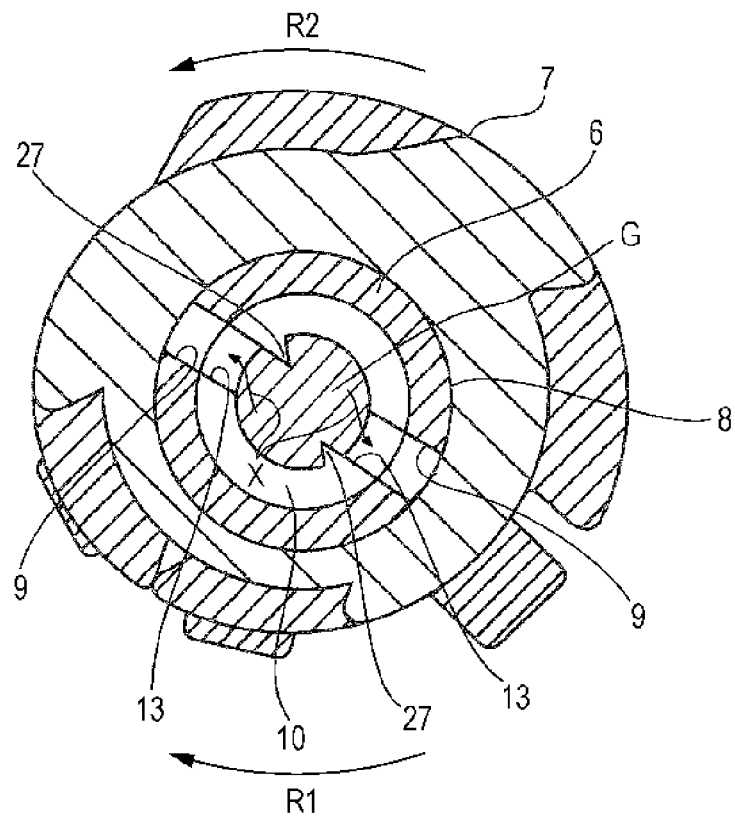
FIG. 10 is a side cross-sectional view showing a rotation shaft for transporting a medium in a recording apparatus according to a third embodiment of the invention.

Third Embodiment FIG. 10

Next, a recording apparatus according to a third embodiment of the invention will be described. Note that constituent elements overlapping with those of the above embodiment are denoted by the same reference numerals, and thus detailed description thereof will be omitted.

FIG. 10 is a side cross-sectional view showing a rotation shaft for transporting a medium in the recording apparatus according to the third embodiment of the invention.

The recording apparatus 1 of the present embodiment is also configured to cause the rotation shaft 6 to rotate in the rotation direction R1 during the normal medium transport and to cause the rotation shaft 6 to rotate in the rotation direction R2 when the lubricating material G is drawn to the contact portion 8 in the same manner as in the second embodiment.

In addition, the holes 13 of the present embodiment are provided with ribs 27 on rear ends of an inner side of the rotation shaft 6 in the rotation direction R2, which are protrusions extending in a longitudinal direction of the rotation shaft 6.

With the above configuration of the recording apparatus 1 of the present embodiment, since the ribs 27 serve as guides when the lubricating material G is drawn only when the lubricating material G is to be drawn to the contact portion 8, the lubricating material G can be reliably drawn to the contact portion 8. To describe differently, the ribs 27 play a role of guiding the lubricating material G to be drawn in a direction X when the rotation shaft 6 rotates in the rotation direction R2, and a role of suppressing the lubricating material G from being drawn to the holes 13 when the rotation shaft 6 rotates in the rotation direction R1.

Note that a shape of the ribs 27 is preferably decided based on the type of the lubricating material to be used, the range in which the rotation speed of the rotation shaft 6 can be controlled, and the like.

In addition, the recording apparatus 1 of the present embodiment is configured to cause the rotation shaft 6 to rotate in the rotation direction R1 during the normal medium transport, and to cause the rotation shaft 6 to rotate in the rotation direction R2 when the lubricating material G is drawn to the contact portion 8 in the same manner as in the second embodiment. However, it may possible to set the same configuration as that of the first embodiment such that the rotation shaft 6 rotates in the rotation direction R1 during the normal medium transport and when the lubricating material G is drawn to the contact portion 8, or that the rotation speed of the rotation shaft 6 when the lubricating material G is drawn to the contact portion 8 is higher than that during the normal medium transport. In the case of the configuration, the ribs 27 are provided on the rear ends of the inner side of the rotation shaft 6 in the rotation direction R1 (the rotation direction when the lubricating material G is drawn to the contact portion 8).

Even in the configuration described above, when the lubricating material G is to be drawn to the contact portion 8, since the ribs 27 serve as guides while the lubricating material G is drawn, the lubricating material G can be surely drawn to the contact portion 8.

Figure 11:
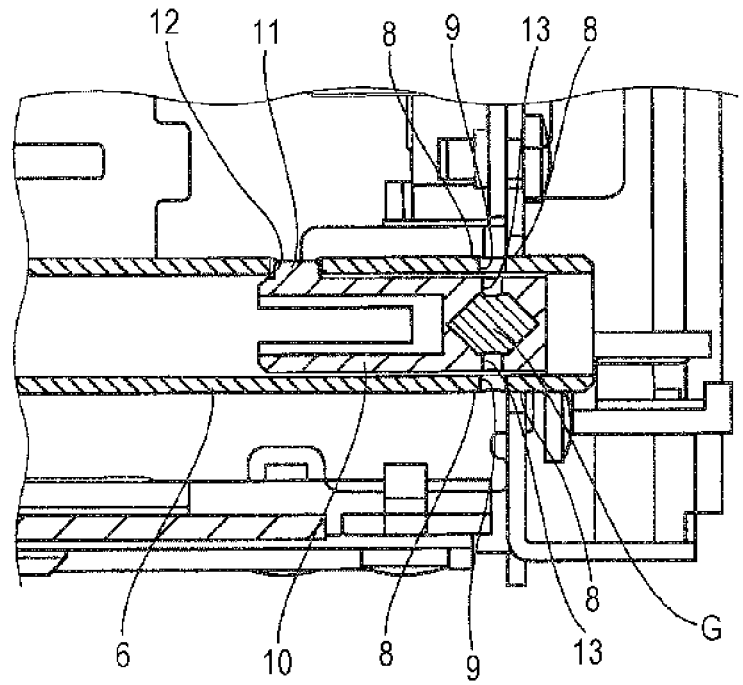
FIG. 11 is a front cross-sectional view showing a rotation shaft for transporting a medium in a recording apparatus according to a fourth embodiment of the invention.

Fourth Embodiment FIG. 11

Next, a recording apparatus according to a fourth embodiment of the invention will be described. Note that constituent elements overlapping with those of the above embodiment are denoted by the same reference numerals, and thus detailed description thereof will be omitted.

FIG. 11 is a front cross-sectional view showing a rotation shaft for transporting a medium in the recording apparatus according to the fourth embodiment of the invention.

In the recording apparatus 1 of the present embodiment, the lubricating material containing unit 10 that contains the lubricating material G inside the rotation shaft 6 tapers toward an outer side (a hole 9 side) of the rotation shaft 6 from the inner side (a rotation center side) thereof.

For this reason, it is possible to cause the lubricating material G contained in the lubricating material containing unit 10 to be drawn to the contact portion 8 with efficiency.

Note that the lubricating material containing unit 10 is preferably configured to smoothly taper toward the outer side of the rotation shaft 6 from the inner side thereof without a level as described in the present embodiment. This is for causing the lubricating material G contained in the lubricating material containing unit 10 to be drawn to the contact portion 8 with higher efficiency.

Figure 12:
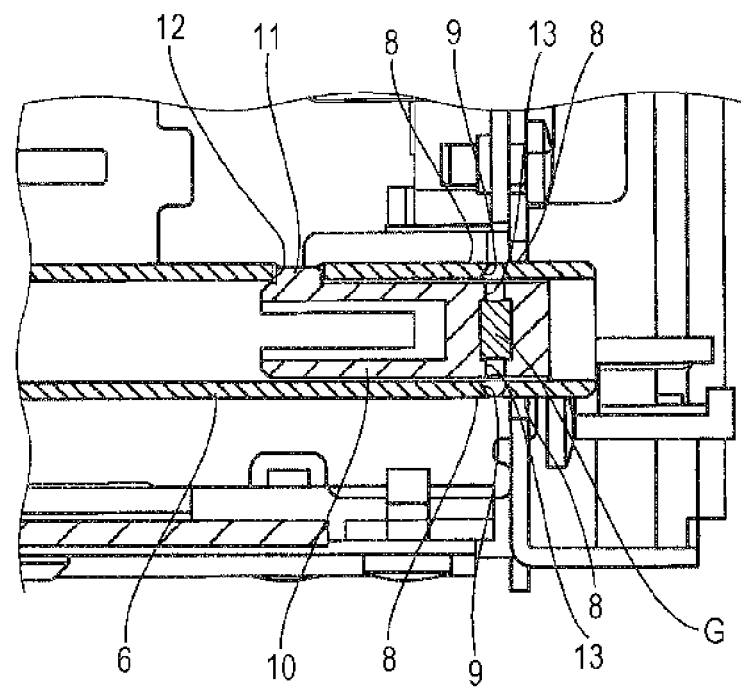
FIG. 12 is a front cross-sectional view showing a rotation shaft for transporting a medium in a recording apparatus according to a fifth embodiment of the invention.

Fifth Embodiment FIG. 12

Next, a recording apparatus according to a fifth embodiment of the invention will be described. Note that constituent elements overlapping with those of the above embodiment are denoted by the same reference numerals, and thus detailed description thereof will be omitted.

FIG. 12 is a front cross-sectional view showing a rotation shaft for transporting a medium in the recording apparatus according to the fifth embodiment of the invention.

In the recording apparatus 1 of the present embodiment, each of the holes 9 tapers toward the outer side of the rotation shaft 6 from the inner side thereof.

For this reason, it is possible to accurately set a drawing destination of the lubricating material.

Figure 13:
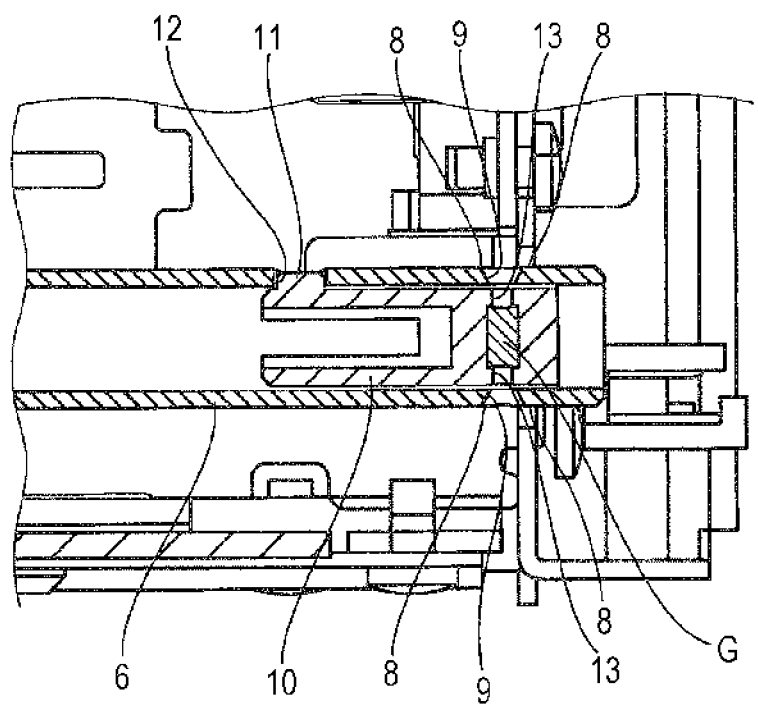
FIG. 13 is a front cross-sectional view showing a rotation shaft for transporting a medium in a recording apparatus according to a sixth embodiment of the invention.

Sixth Embodiment FIG. 13

Next, a recording apparatus according to a sixth embodiment of the invention will be described. Note that constituent elements overlapping with those of the above embodiment are denoted by the same reference numerals, and thus detailed description thereof will be omitted.

FIG. 13 is a front cross-sectional view showing a rotation shaft for transporting a medium in the recording apparatus according to the sixth embodiment of the invention.

In the recording apparatus 1 of the present embodiment, the holes 9 widen toward the outer side of the rotation shaft 6 from the inner side thereof.

For this reason, it is possible to draw the lubricating material in a wide range.

Figure 14:
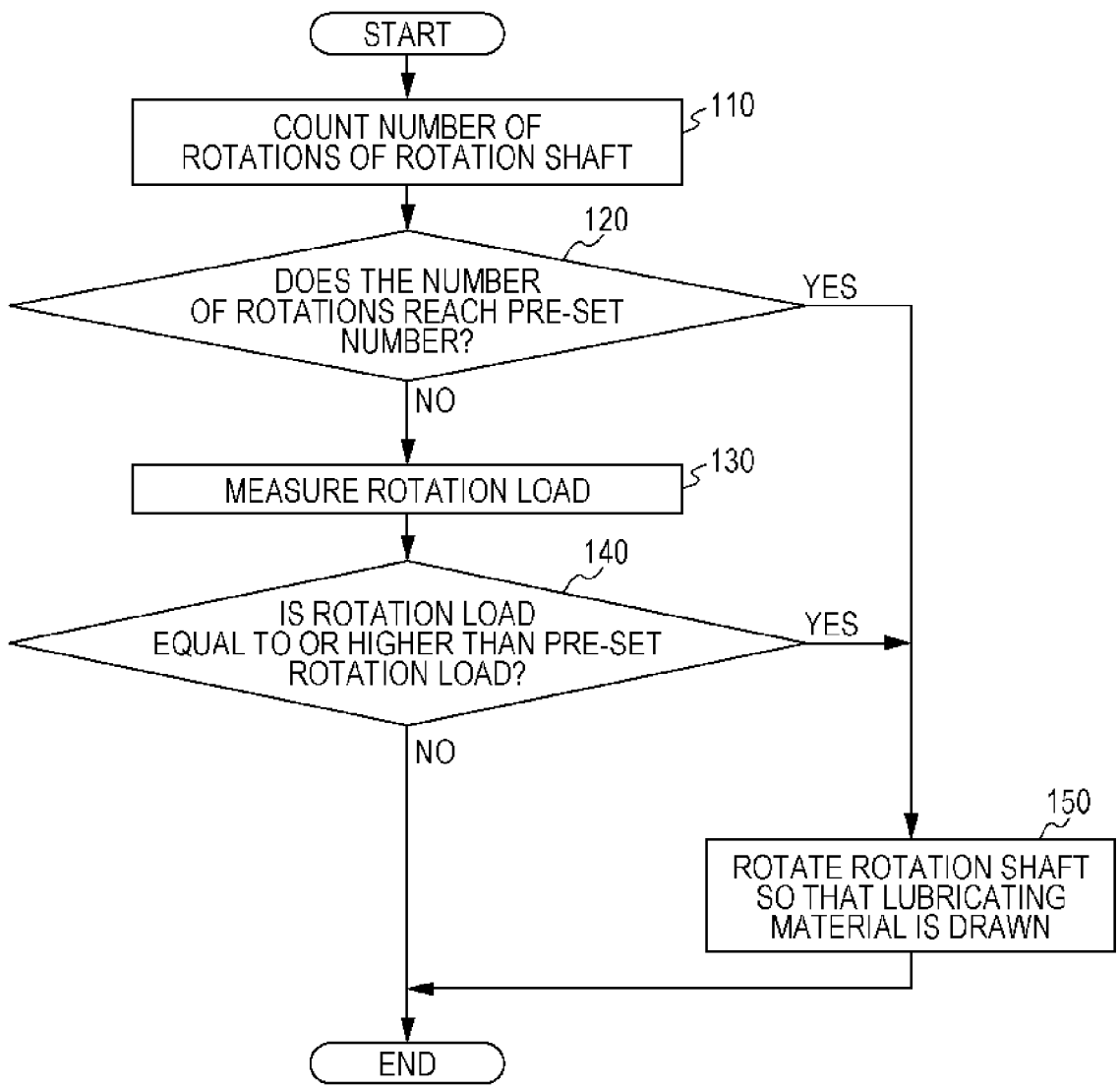
FIG. 14 is a flowchart describing an embodiment of a lubricity maintaining method of the invention.

Embodiment of a Lubricity Maintaining Method FIG. 14

Next, an embodiment of a lubricity maintaining method of the invention will be described.

FIG. 14 is a flowchart describing the embodiment of the lubricity maintaining method of the invention.

Note that the lubricity maintaining method of the present embodiment is an embodiment implemented using the recording apparatus 1 of the first embodiment.

In the lubricity maintaining method of the present embodiment, first in Step S110, the control unit 16 counts the number of rotation times of the rotation shaft 6. Note that the recording apparatus 1 that implements the lubricity maintaining method of the present embodiment has the EEPROM 28 in the control unit 16, which is configured to be able to overwrite and store the number of rotation times of the rotation shaft 6.

Next, in Step S120, the control unit 16 determines whether or not the number of rotation times of the rotation shaft 6 reaches a pre-set number. When the control unit 16 determines that the number of rotation times of the rotation shaft 6 reaches the pre-set number, the process proceeds to Step S150, where the control unit 16 controls rotation of the rotation shaft 6 such that the lubricating material G is drawn to the contact portion 8 from the lubricating material containing unit 10 via the holes 13 and 9, and thereby the lubricity maintaining method of the present embodiment ends. When the control unit 16 determines that the number of rotation times of the rotation shaft 6 does not reach the pre-set number, the process proceeds to Step S130.

Next, in Step S130, the control unit 16 measures the rotation load of the rotation shaft 6 on the bearing 7 together with the rotation load sensor 26, and the process proceeds to Step S140.

Next, in Step S140, the control unit 16 determines whether or not the rotation load measured in Step S130 is equal to or higher than the pre-set rotation load. When the control unit 16 determines that the rotation load is equal to or higher than the pre-set rotation load, the process proceeds to Step S150, and the control unit 16 controls the rotation of the rotation shaft 6 such that the lubricating material G is drawn to the contact portion 8 from the lubricating material containing unit 10 via the holes 13 and 9, and thereby the lubricity maintaining method of the present embodiment ends. When the control unit 16 determines that the rotation load is less than the pre-set rotation load, the lubricity maintaining method of the present embodiment ends without change.

Note that the lubricity maintaining method of the present embodiment is a method that includes a process of determining whether or not the number of rotation times of the rotation shaft reaches a pre-set number and a process of determining whether or not a rotation load is equal to or higher than the pre-set rotation load. However, the method may be a method that includes only either one of the processes.

Furthermore, the method may be a method that includes a process of determining whether or not the time measured by the timer 29 reaches a pre-set time, a process of controlling rotation of the rotation shaft 6 such that the lubricating material G is drawn to the contact portion 8 when the measured time reaches the pre-set time, a process of finishing the method without change when the measured time does not reach the pre-set time, and the like.

The entire disclosure of Japanese Patent Application No. 2012-255009, filed Nov. 21, 2012 is expressly incorporated by reference herein.

What is claimed is:

1. A medium transport device comprising:
a rotation shaft that enables transport of a medium as it rotates; and
a bearing of the rotation shaft,
wherein the rotation shaft is provided with a hollow portion, a lubricating material containing unit that contains a lubricating material inside an end portion of the hollow portion, and holes that are open to a contact portion with the bearing from the lubricating material containing unit,
wherein the lubricating material can be drawn to the contact portion from the lubricating material containing unit via the holes, and
wherein the holes are provided with ribs on rear ends of inner sides of the rotation shaft in the rotation direction of the rotation shaft when the lubricating material is drawn to the contact portion.

2. A medium transport device comprising:
a rotation shaft that enables transport of a medium as it rotates;
a bearing of the rotation shaft; and
a control unit that controls rotation of the rotation shaft,
wherein the rotation shaft is provided with a hollow portion, a lubricating material containing unit that contains a lubricating material inside an end portion of the hollow portion, and holes that are open to a contact portion with the bearing from the lubricating material containing unit,
wherein the lubricating material can be drawn to the contact portion from the lubricating material containing unit via the holes, and
wherein the control unit controls the rotation of the rotation shaft such that a rotation speed of the rotation shaft when the lubricating material is drawn to the contact portion from the lubricating material containing unit via the holes is higher than a rotation speed of the rotation shaft when the medium is transported.

\* \* \* \* \*